United States Patent

Swars

[11] Patent Number: 5,868,042
[45] Date of Patent: Feb. 9, 1999

[54] MULTIPLE CAMS

[75] Inventor: Helmut Swars, Bergisch-Gladbach, Germany

[73] Assignee: Emitec Gesellschaft für Emissionstechnologie mbH, Lohmar, Germany

[21] Appl. No.: 702,574

[22] PCT Filed: Mar. 1, 1995

[86] PCT No.: PCT/DE95/00292

§ 371 Date: Sep. 3, 1996

§ 102(e) Date: Sep. 3, 1996

[87] PCT Pub. No.: WO95/23911

PCT Pub. Date: Sep. 8, 1995

[30] Foreign Application Priority Data

Mar. 2, 1994 [DE] Germany .......................... 44 06 754.2

[51] Int. Cl.⁶ .............................. F16H 53/02; F01L 1/047
[52] U.S. Cl. ............................................. 74/567; 29/888.1
[58] Field of Search .............................. 74/567; 29/888.1; 72/367

[56] References Cited

U.S. PATENT DOCUMENTS

| | | | |
|---|---|---|---|
| 3,869,938 | 3/1975 | Schlotterbeck et al. | 74/567 |
| 4,708,029 | 11/1987 | Urano | 74/567 |
| 5,040,294 | 8/1991 | Harle | 29/888.1 |
| 5,187,866 | 2/1993 | Rhoades | 74/567 X |
| 5,218,883 | 6/1993 | Swars | 74/567 |

FOREIGN PATENT DOCUMENTS

| | | |
|---|---|---|
| 213 529 | 10/1990 | European Pat. Off. . |
| 309 899 | 11/1991 | European Pat. Off. . |
| 2213224 | 9/1973 | Germany . |
| 8525769 | 11/1985 | Germany . |
| 3528464 | 2/1987 | Germany ............ 29/888.1 |
| 8709009 | 10/1987 | Germany . |
| 3736453 | 5/1989 | Germany . |
| 17816 | 2/1978 | Japan ............ 74/567 |
| 33043 | 2/1984 | Japan ............ 72/367 |

Primary Examiner—Charles A. Marmor
Assistant Examiner—Mary Ann Battista
Attorney, Agent, or Firm—Cohen, Pontani, Lieberman & Pavane

[57] ABSTRACT

A hollow body and a method for producing a hollow body having at least two oval sleeves and an annular connecting journal between each of the sleeves. Each of the sleeves has uniform circumferential wall thickness and an outer peripheral region having a smaller radius and forming a crown. The annular connecting journals have a uniform circumferential wall thickness, a circular inner surface and are disposed between each of the oval sleeves. Each oval sleeve projects over the annular connecting journal in the region of the smaller radius with the projection being greatest at the crown. The wall thickness of the annular connecting journal is partly greater than the wall thickness of the oval sleeve. The annular connecting journal and the oval sleeve have equal cross-sectional areas. Material remaining between the annular connecting journal and the oval sleeves after forming is removed from the small radius region of the oval sleeve.

12 Claims, 2 Drawing Sheets

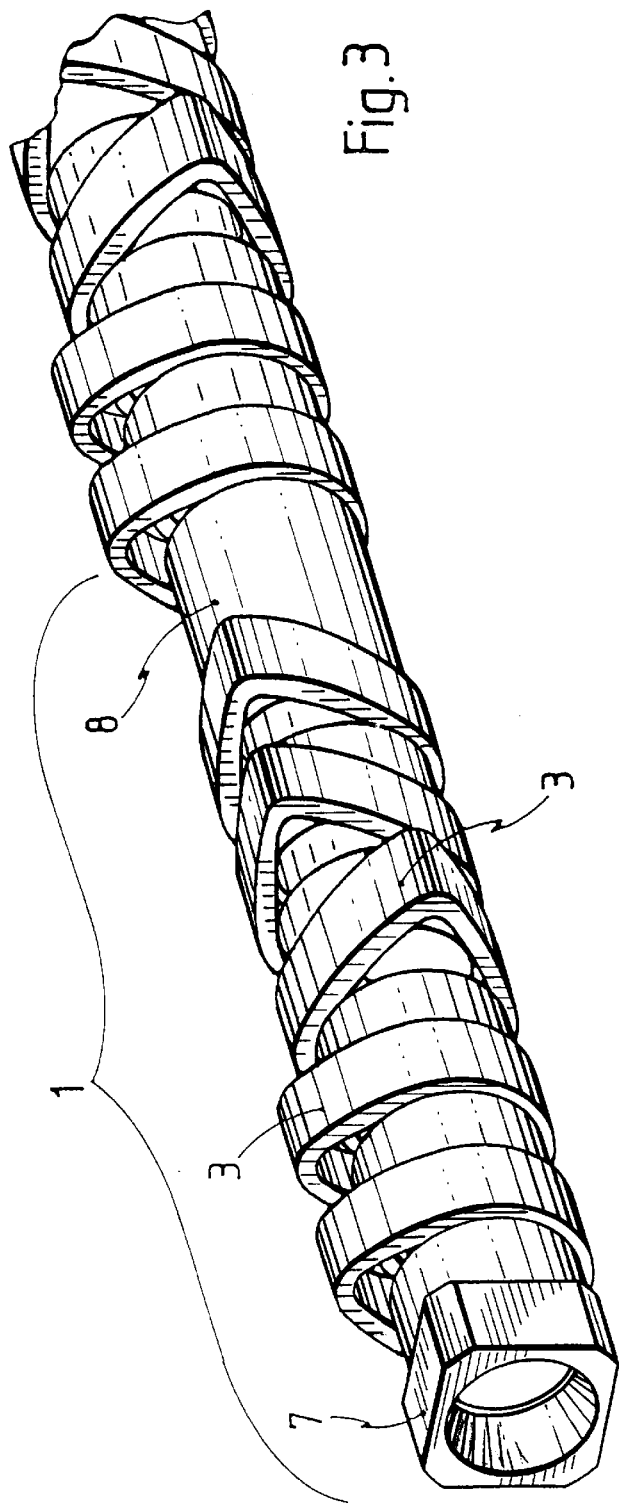
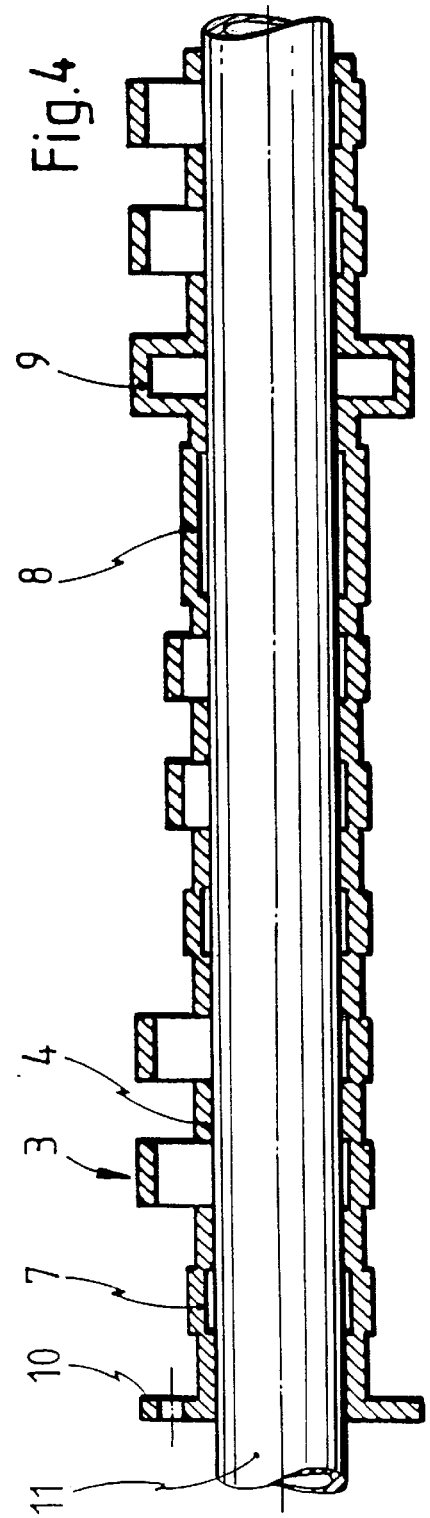

MULTIPLE CAMS

BACKGROUND OF THE INVENTION

1. Field of the Invention

The invention relates to hollow bodies with at least two oval sleeves and an annular connecting journal arranged between each of the sleeves, and more particularly, to cam groups formed from part of the outer peripheral surface of the sleeves having annular connecting journals been each sleeve. A projects beyond the connecting journals at least in the region of the sleeve having a smaller radius. The projection is greater at the crown of the smaller radius than in the other regions, and the circumference of the annular connecting journal is smaller than the inner circumference of the oval sleeves. The invention also relates to a process to for producing such hollow bodies.

An example of such hollow bodies, in reference to which the invention is described but to which the invention is not limited, are arrangements of at least two cams, known as cam packs or cam groups. In the case of joined hollow cam shafts, it is known to combine at least two cams into groups, whereby the individual cams of the group are connected to one another by means of connecting sleeves.

2. Description of the Prior Art

Cam groups of this type are known in the art, as disclosed in European Patent Number EP 0 213 529, wherein the cams and the connecting sleeves arranged between them have the same inner diameter. When such cam groups are joined to a tube, the tube sections located below the cam groups are deformed plastically, but the tube groups are only deformed elastically. The resilience of the cam groups requires the use of very high pressure to produce the pressure responsible for the frictional connection between the cam groups and tube sections.

In order to avoid these high pressures, cam groups are suggested in European Patent Number EP 0 309 899, wherein the cams have larger inner diameters than the connecting sleeves, so that when expansion takes place, only the connecting sleeves are held frictionally. As a result, especially if the connecting sleeves are thin-walled, significantly reduced deformation forces are required.

German Patent Number DE A 2232438 describes a hollow body that consists of a hollow cylindrical tube, which is broadened in a die around the area of the cams while maintaining its circular-cylindrical shape in the area between the cams. The hollow body described in DE A 2232438 is produced by die casting where the material of the original hollow cross-section flows into recesses in the die and whereby the material of the tube can also flow, along with the cams, into the cam recesses of the die. The resulting finished hollow cam tube has no significant differences in wall thickness over its entire length. DE A 2232438 does not describe a hollow body that has equally large cross-sectional areas in the sleeves and connecting journals. Furthermore, the material between the sleeves and connecting journals is not sheared off. Finally, no tube produced according to the description of DE A 2232438 is shaped over its entire length into an oval, which shape corresponds to the shape of the finished sleeves.

German Patent Number DE A 3439973 describes a process wherein a hollow body is produced from a tube which is circumferentially more narrow in the area of connecting journals and which circumferentially broadens to the shape of sleeves in the cam areas. According to this process, the tube is thus not shaped over its entire length into an oval shape corresponding to the shape of the sleeves. Furthermore, excess material is not sheered off between the sleeves and the connecting journals. Accordingly, hollow bodies produced according to the process disclosed in DE A 3439973 are broadened only in the cam area, not over the entire length of the hollow body, as in the present invention.

Known cam packs of this type are usually cast or sintered or produced from a solid shape.

The manufacture of such cam groups is very expensive.

SUMMARY OF THE INVENTION

It is accordingly an object of the present invention to provide cam packs that can be inexpensively produced, are lighter than the known cam groups, and offer advantages in mechanically working the cams.

This object is attained according to the present invention by the fact that an above-described hollow body consists of ductile material, that its sleeves and connecting journals have substantially uniform wall thicknesses over the circumference of the hollow body, and that the wall thickness of the connecting journal is at least partly greater than that of the sleeves, but at the most by an amount such that the cross-sectional areas of the sleeves and the connecting journal are equal. This object is achieved by means of a process to manufacture a hollow body from a tube that is first shaped over its entire length into an oval tube corresponding to the shape of the sleeves, wherein the tube is shaped section-by-section at certain distances into a ring with a given inner diameter and a connecting journal is formed between each of the sleeves.

Compared to the known cam groups, such a hollow body has the advantage of being simply and efficiently producible from economical starting material and of being lighter.

In an embodiment of the present invention, the material between the sleeves and the connecting journal in the region of the smaller radii is partially separated, e.g., sheared off. Whereas in the case of the known cam groups, the cam tips of the cams are not offset over the of the hollow body, in the hollow bodies according to the present invention, the crowns of the smaller sleeve radii can be offset relative to one another by predetermined angular degrees over the of the hollow body. As a result, if the connecting journal extends laterally into the sleeve interior in those regions where the projection is greater than the wall thickness of the sleeves, then an advantageous support of the sleeves is established in the region of the smaller radii.

Whereas in conventional cams, concave running path areas must be produced by grinding, according to the present invention, these can be produced very simply, after the normal grinding of the cam running surfaces, by indenting the sleeves below the crown of the smaller radii. When such a hollow body has several connecting journals, e.g., as including some on the outer sides of the lateral sleeves, their circular inner surfaces align with one another. The annular connecting journals can advantageously be designed as radial bearings for such hollow bodies. However, it is also possible for further ring elements, the inner diameter of which is larger than that of the connecting journals, to be provided coaxially relative to the connecting journals, and for these rings to be designed as functional elements, e.g., axial or radial bearings, adjustment polygons, flange parts, etc. Hollow bodies designed in this manner can be used directly as cam shafts. If they do not have sufficient strength or stiffness for certain applications, it is advantageously possible to arrange a support tube in their interior. It is especially advantageous to join such hollow bodies to a tube in a force-locking manner, for example, by means of the hydraulic expansion of the tube. Such hollow bodies, which can be used as cam packs, have the advantage of being producible very economically and with high precision, without requiring reworking of the borings and the outer contour after shaping. It is especially advantageous to shape a tubular rod that is several meters long into a plurality of such cam packs; after shaping, the cam packs can be separated from this tubular rod individually or in groups.

The hollow bodies according to the invention offer particular advantages for joining such cam packs on tubes to hollow cam shafts. Compared to conventionally manufactured multiple cams, the hollow bodies according to the invention permit simplified holding in the expansion device and better angular tolerances and bearing tolerances. In addition, such cam packs can be finished, e.g., ground or hardened, prior to joining. Advantageously, they offer the option of relatively narrow cam disks, which can be arranged closely next to one another, because the separation in the region of the smaller radii, i.e., of the cam tips, means that no space-consuming material transitions are required.

The one-piece connection of the cams that are formed by the sleeves and the connecting journals that serve as joining points makes it possible to improve the transmissible torque. Because only the connection elements are widened during joining, the cam contours are not effected by the expansion and their quality is not adversely affected.

The indentations next to the cam elevations, i.e., in the region of the smaller radii of the oval on both sides of the breadth of the cam, can advantageously be produced by shearing off the material during twist shaping. The hollow bodies according to the invention can advantageously be produced by cold working, both for backpressing the connecting journals and for twist shaping the cam tips; for example, pressing, hammering or a combination of the two can be used as the shaping method. Advantageously, in the case of twist shaping and backpressing, a calibrating mandrel is used in the middle of the hollow body, as a result of which the required expansion tolerances can be created and maintained in an advantageous manner. With twist shaping the oval sleeve is twisted in at least one portion so that the crown of the sleeve portion is offset from the crown of an adjacent sleeve portion by a predetermined angle. The cross-sectional shape of the sleeve is maintained during twisting.

Hardening the cam running surfaces, for example, by means of electron beam or laser processes, is possible prior to joining, i.e., before expansion, and also after joining, because the expanded regions are clearly separated from the cam running surfaces to be hardened. In the case of prior hardening, the expansion causes no hardening loss. The multiple cam arrangement makes possible quicker, less expensive and more precise assembly. In addition, the ability to process entire cam packs prior to joining permits advantageous size accuracy, especially in respect to angular tolerances. Enlarging the wall thickness of the connecting journals and permitting broadening deformation into the sleeve interiors allows a stiffer construction of the hollow body as a whole.

The multiple cams produced in the form of cam packs offer advantageous prerequisites for use as variable valve controls. The cam packs can be arranged on the shaft as turnable and movable tubular sleeves.

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention. An example of the invention is shown in the drawings and described in greater detail below.

BRIEF DESCRIPTION OF THE DRAWINGS

In the drawings in which like numerals are used to denote similar elements throughout the several views:

FIG. 3 is a perspective view of several hollow bodies according to the present invention with cam-shaped sleeves, connecting journals and functional elements, produced in one-piece fashion;

FIG. 4 is a longitudinal cross-sectional view of a hollow body according to the present invention joined to a tube.

DETAILED DESCRIPTION OF THE PRESENTLY PREFERRED EMBODIMENTS

Figure 1:
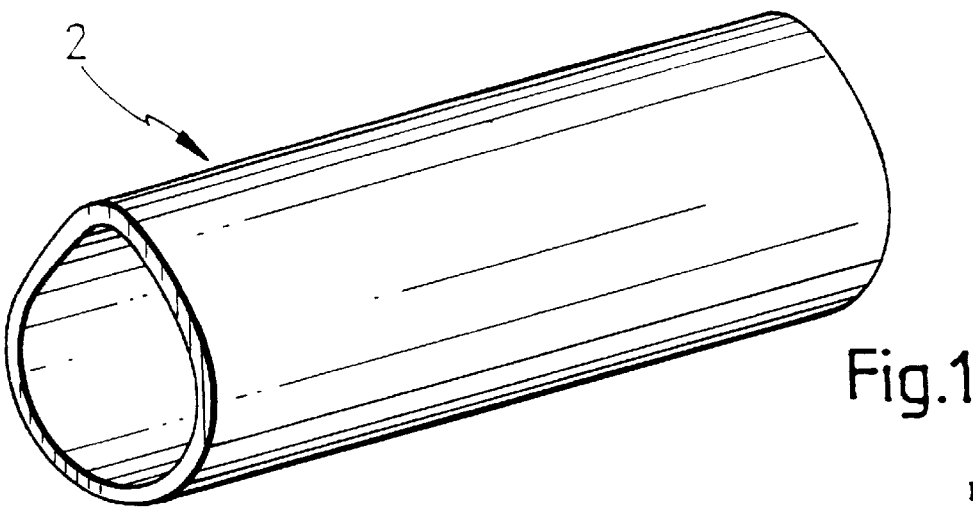
FIG. 1 is a perspective view of a tube formed in a cam shape, according to the present invention.

Referring now to the drawings in detail, a hollow body constructed in accordance with the present invention is produced from a tube of ductile material. In a first work step, the tube is shaped over its entire length into a cam-shaped tube 2, as shown in FIG. 1.

Figure 2:
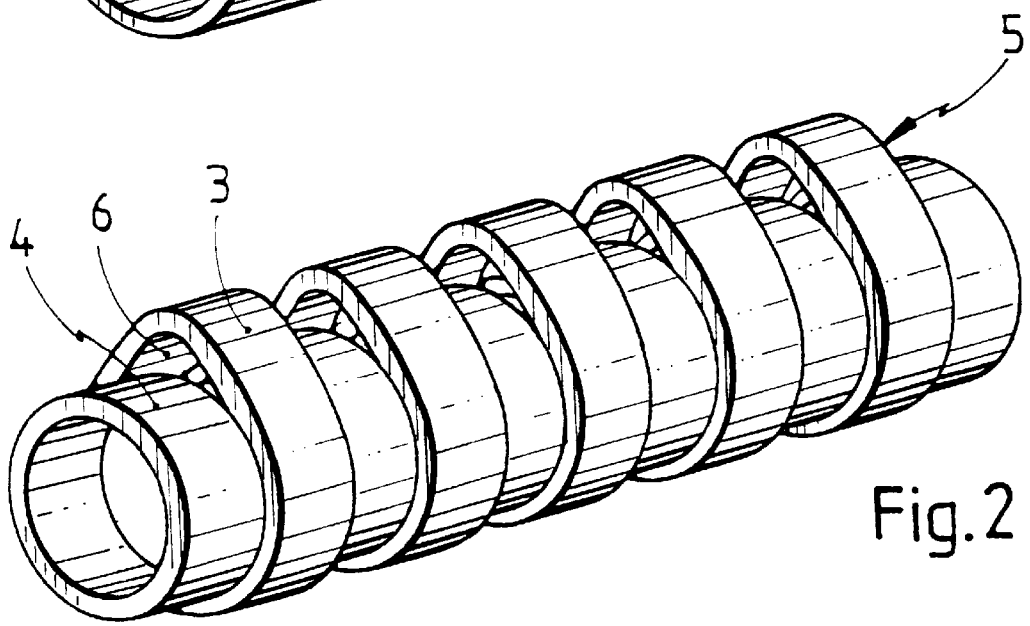
FIG. 2 is a perspective view of a hollow body that consists alternately of connecting journals and cam-shaped sleeves.

FIG. 2 shows a hollow body, wherein annular connecting journals 4 are shaped by means of shaping on both sides of cam-shaped sleeves 3. In the example shown, the radial projection of the cam-shaped sleeve 3 over the annular connecting journal 4 is clearly shown, particularly in the region of the cam-shaped sleeve 3 having a smaller radius, i.e., in the region of cam tip 5.

Shaping the connecting journal regions from the original single cam-shaped tubular profile 2 can be carried out especially advantageously using cold-working methods, e.g., by hammering, pressing or a combination of these two shaping processes. Because the corresponding tube sections in question initially have a larger circumference, when shaping into the annular connecting journal 4 with a smaller circumference occurs, a correspondingly larger wall thickness is created, due to the constant volume. However, this wall thickness is substantially uniform over the circumference of the connecting journal 4, and its dimensions are such that the cross-sectional area of the annular connecting journal 4 is approximately equal to the cross-sectional area of the cam-shaped sleeve 3.

If, as in the example shown, the radial projection of the cam tip 5 over the annular connecting journal 4 is larger than the wall thickness of the cam-shaped sleeve 3, an empty projection space 6 is created. The separation of the materials between the side regions of the annular connecting journals 4 and the cam-shaped sleeves 3 can be prepared by indentations on the tube surface. However, this can also be done more simply by means of shearing during deformation, as a result of which no spaces are created in the axial direction between the connecting journals 4 and the cam-shaped sleeves 3. By suitably controlling the shaping process during the production of the annular connecting journals, the material of the connecting journals 4 is deformed in a broadening manner in the region of the empty projection spaces 6, so that the side surfaces of the connecting journals 4 extend into the empty projection space 6 of the cam-shaped sleeves 3 in this region. In this way, additional support can be provided to the particular area of the sleeve in the transition region.

In the example shown in FIG. 2, there are connecting journals 4 on both sides in front of the lateral cam-shaped sleeves 3. However, it is also possible for the respective cam-shaped sleeves 3 to constitute the outermost elements in such a hollow body.

In a preferred embodiment of the shaping process, lateral indentation or notching can be used to form a very sharp-edged transition between the connecting journals 4 and the cam-shaped sleeves 3. Advantageously, such arrangements can be designed very precisely and compactly in the axial direction, because no soft contour transitions are created. In examples with more than one connecting journal 4, the inner diameters of the connecting journals 4 align in the axial direction. This is necessary in the case of at least two connecting journals 4 when the hollow body is reinforced by an interior support tube or is to be joined to an interior tube. If not all of the connecting journals 4 meet this requirement, the inner diameters of the other connecting journals 4 must be larger than those of the aligning connecting journals 4 and are not permitted to extend even partially into this alignment.

In the example shown in FIG. 3, the cam tips 5 are partially offset relative to one another. In the first step, as shown in FIG. 2, all of the cam tips 5 had the same orientation. Shaping the cam tips 5 into offset arrangement can also be carried out by cold-working processes and permits the basic cam shape to be maintained to the greatest extent possible.

In the example in FIG. 3, additional functional elements are provided. In a single piece with the hollow body 1, it is also possible to produce, for example, adjustment polygons 7. The example has a quadrangular adjustment polygon 7, radial bearings 8, axial bearings 9 and flange parts 10 (see FIG. 4).

As shown by the cross-sectional side view of the longitudinal section in FIG. 4, the radial bearings 8 and the flange parts 10 are made of parts, the inner diameters of which are equal to those of the smallest aligned connecting journals 4. When a support or interior tube 11 is inserted into and joined with the hollow body 1, a built-up hollow shaft is formed and the inner diameter of the radial bearings 8, flange parts 10 and connecting journals 4 rest in a form- or force-locking manner on the tube 11. The quadrangular adjustment polygons 7 and axial bearings 9 do not rest with their inner diameters on the interior tube. The tube 11 is joined to the hollow body by being plastically deformed by inner expansion so that the connecting journal 4 is elastically deformed and the circular inner surface thereof rests on the outer surface of the tube 11 in a force-locking manner.

Hollow bodies 1 can be used as drive shafts individually or in multiples arranged one behind the other in one-piece fashion. Such hollow bodies 1 can advantageously be produced in one piece in the form of modules from a long tube and separated as needed from this tube. When such hollow bodies 1 are joined to an interior tube in order to form joined hollow shafts, e.g., hollow cam shafts, accuracy of the inner diameters of the joined surfaces is especially important. This can be achieved advantageously by shaping the hollow body 1 over an internal calibrating mandrel.

If necessary, the hollow bodies 1 can be worked, for example, by grinding, polishing, hardening, etc., prior to joining, so that reworking is unnecessary after the built-up shaft has been produced. In this case, the hollow body 1 according to the present invention has the advantage that the surface-treated or surface-worked parts are not deformed during joining, so that the results achieved by working are not impaired. However, working can also be carried out after joining if, in special cases, this results in advantages for the overall product.

Figure 5:
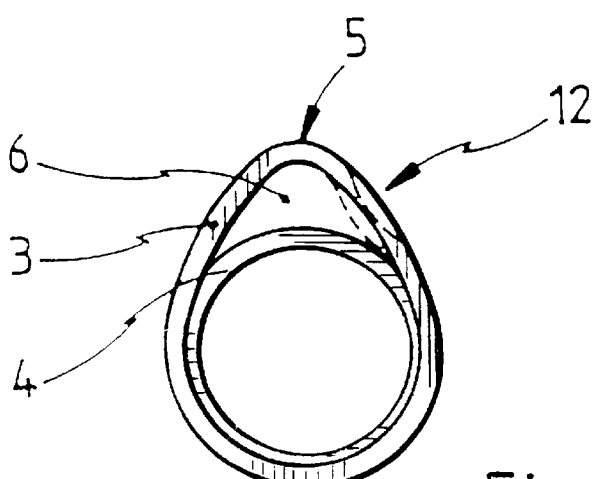
FIG. 5 is a cross-sectional view of a hollow body according to the present invention with a partially concave cam profile produced by indentation.

FIG. 5 shows the cross-section of a hollow body 1, wherein a section below the crown of the smaller radius 5 has been deformed by indentation (identified by reference number 12). An example in which such an embodiment is used is that of cam profiles with concave running surfaces, for example, such as may be needed for the rocker control of valves. Conventionally, such concave cam running surfaces have been produced by means of grinding, which is especially difficult and expensive. In the hollow bodies 1 according to the present invention, it is possible to simply indent the appropriate regions, because the ductile material has a uniform wall thickness that provides particularly simple preconditions for this chipless deformation. In the example shown, the indentation 12 is present only on one side. However, it can also be embodied on both sides of the crown, symmetrically or asymmetrically.

Compared to conventional cam packs, the hollow bodies 1 according to the present invention have the advantage of being significantly lighter in weight. The one-piece design, supported by the enlargement in wall thickness of the connecting journals 4 in the course of shaping, also provides these hollow bodies 1 with high strength and stiffness.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

I claim:

1. A hollow body comprising:

two oval sleeves having a first radius of curvature and a circumferentially uniform wall thickness and an outer peripheral region forming a crown having a second radius of curvature smaller than the first radius of curvature;

an annular connecting journal having a circumferentially uniform wall thickness and a circular inner surface, said annular connecting journal being disposed between said two oval sleeves;

said crowns of said two oval sleeves being configured to project radially from an outer surface of said annular connecting journal so that an empty space remains between a longitudinal extension of the outer surface of said annular connecting journal and said two oval sleeves at said crowns;

wherein said wall thickness of said annular connecting journal being at least partly greater than said wall thickness of said two oval sleeves; and wherein said annular connecting journal and each of said two oval sleeves having equal cross-sectional areas.

2. The hollow body of claim 1, wherein said crowns of said two oval sleeves are offset relative to one another by a predetermined angle over a circumference of said hollow body.

3. The hollow body of claim 1, wherein one of said two oval sleeves comprises an exterior sleeve having an outer side, and further comprising an additional first annular connecting journal having a circular inner surface arranged adjacent said outer side so as to align with said circular inner surface of said annular connecting journal which is arranged adjacent and opposite said outer side of said exterior sleeve.

4. The hollow body of claim 1, wherein said annular connecting journal further comprises a radial bearing.

5. The hollow body of claim 1, further comprising a ring element having an inner diameter and being disposed coaxial to said annular connecting journal, said inner diameter being larger than said circular inner surface of said connecting journal.

6. The hollow body of claim 1, further comprising a tube having an outer surface and being disposed within said hollow body, wherein said tube is deformed plastically by means of inner expansion and wherein said annular connecting journal is deformed elastically and wherein said circular inner surface of said annular connecting journal rests on said outer surface of said tube in a force-locking manner.

7. The hollow body of claim 1, wherein a projecting length in a region of the crown is larger than the wall thickness of the sleeves.

8. The hollow body of claim 1, wherein said two oval sleeves have a surface area located below said crown having an indent.

9. The hollow body of claim 8, wherein said indent has a curvature that is opposite to adjacent non-indented regions.

10. A method for producing a hollow body from a tube, comprising the steps of:
   (a) shaping said tube over its entire length into an oval sleeve having a radius of curvature with a crown having a smallest peripheral radius of curvature of said oval sleeve;
   (b) forming said oval sleeve over a calibrating mandrel into sectional rings thereby forming at least two oval sleeve portions and an annular connecting journal disposed between said at least two oval sleeve portions at predetermined distances along said oval sleeve; said forming being achieved by impressing a very sharp-edged transition in said oval sleeve between said sleeve portions and said connecting journal;
   (c) shearing-off material of the connecting journal in a region of the crown so that an empty space remains between a longitudinal extension of an outer surface of the connecting journal and an inner surface of the crown;
   (d) twisting at least one of said oval sleeve portions so that said crown of said at least one sleeve portion is offset from said crown of another of said sleeve portions by a predetermined angle; and
   (e) maintaining the cross-sectional shape of said at least one sleeve portion during said twisting.

11. The method of claim 10, wherein said shaping, said forming and said twisting are performed on a cold tube.

12. A method for producing a hollow body from a tube, comprising the steps of:
   (a) shaping said tube over its entire length into an oval sleeve having a radius of curvature with a crown having a smallest peripheral radius of curvature of said oval sleeve;
   (b) forming said oval sleeve over a calibrating mandrel into sectional rings thereby forming at least two oval sleeve portions and an annular connecting journal disposed between said at least two oval sleeve portions at predetermined distances along said oval sleeve, said forming being achieved by impressing a very sharp-edged transition in said oval sleeve between said sleeve portions and said connecting journal;
   (c) shearing-off material of the connecting journal in a region of the crown;
   (d) twisting at least one of said oval sleeve portions so that said at least one sleeve portion is offset from said crown of another of said sleeve portions by a predetermined angle;
   (e) maintaining the cross-sectional shape of said at least one sleeve portion during said twisting, said crown of said offset portion projecting beyond a wall thickness of said another sleeve portion; and
   (f) expanding said connecting journal disposed between said offset sleeve portion and said another sleeve portion into a region under said crown.

\* \* \* \* \*